US012631798B2

(12) United States Patent (10) Patent No.: US 12,631,798 B2

Shim et al. (45) Date of Patent: May 19, 2026

(54) COVER WINDOW AND DISPLAY DEVICE INCLUDING THE SAME

(71) Applicant: Samsung Display Co., Ltd., Yongin-Si (KR)

(72) Inventors: Byoung Yul Shim, Yongin-si (KR); Dong Hee Lee, Yongin-si (KR); Jae Seung Jeon, Yongin-si (KR); Eun Young Cho, Yongin-si (KR); Beom Gyu Choi, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 307 days.

(21) Appl. No.: 18/242,000

(22) Filed: Sep. 5, 2023

(65) Prior Publication Data

US 2024/0272333 A1 Aug. 15, 2024

(30) Foreign Application Priority Data

Feb. 9, 2023 (KR) ......................... 10-2023-0017600

(51) Int. Cl.
 *G02F 1/1333* (2006.01)
 *G02B 1/14* (2015.01)
(52) U.S. Cl.
 CPC ..................................... *G02B 1/14* (2015.01)

(58) Field of Classification Search
 CPC ................. G02B 1/14; G02F 1/133331; G02F 1/133305; G02F 1/133512; G02F 2201/50
 See application file for complete search history.

(56) References Cited

U.S. PATENT DOCUMENTS 10,691,171 B2 6/2020 Kang et al.
11,450,832 B2 9/2022 Lee et al.

FOREIGN PATENT DOCUMENTS

JP 2016143666 A * 8/2016 ....... G02F 1/133331
KR 10-2018-0081885 A 7/2018
KR 10-2020-0131365 A 11/2020
KR 10-2022-0105714 A 7/2022
WO 2018-128393 A1 7/2018

* cited by examiner

*Primary Examiner* — Jamara A Franklin
(74) *Attorney, Agent, or Firm* — Innovation Counsel LLP

(57) ABSTRACT

A cover window is disclosed that includes a planar surface part, side surface parts bent from a side surface of the planar side part, and curved surface parts bent from a curved surface of the planar surface part. The cover window includes: a base substrate corresponding to the planar surface part, the side surface parts, and the curved surface parts; and a light blocking layer disposed on the bottom of the base substrate. A rear surface of the base substrate, which corresponds to the curved surface parts, includes: a curved area having a curvature corresponding to the curved surface parts; and a tapered area having a tapered shape.

16 Claims, 7 Drawing Sheets

RA $\begin{cases} CA \\ TA \end{cases}$ $(X \longleftrightarrow X')$

COVER WINDOW AND DISPLAY DEVICE INCLUDING THE SAME

CROSS-REFERENCE TO RELATED APPLICATION

The present application claims priority under 35 U.S.C. § 119(a) to Korean patent application No. 10-2023-0017600 filed on Feb. 9, 2023 in the Korean Intellectual Property Office, the entire disclosure of which is incorporated herein by reference.

BACKGROUND

1. Technical Field

The present disclosure generally relates to a cover window and a display device including the same.

2. Related Art

With the development of information technologies, the importance of a display device which is a connection medium between a user and information increases. Accordingly, display devices such as a liquid crystal display device and an organic light emitting display device are increasingly used.

A display device may include a display panel for providing an image to a user and a cover window for protecting the display panel. Recently, display devices having curved surfaces have been developed, and accordingly, demands for cover windows including curved surfaces have increased.

SUMMARY

Embodiments provide a cover window and a display device including the same, which can prevent or reduce buckling of a corner display part of a display panel, which may occur in a process (or lamination process) of allowing the cover window and a display panel to be bonded to each other.

In accordance with an embodiment of the present disclosure, there is provided a cover window including a planar surface part, side surface parts bent from a side surface of the planar side part, and curved surface parts bent from a curved surface of the planar surface part, the cover window including: a base substrate corresponding to the planar surface part, the side surface parts, and the curved surface parts; and a light blocking layer disposed on the bottom of the base substrate, wherein a rear surface of the base substrate, which corresponds to the curved surface parts, includes: a curved area having a curvature corresponding to the curved surface parts; and a tapered area having a tapered shape.

The rear surface of the base substrate may be an area attached to the display panel.

When viewed on a plane, the tapered shape may be linear or curved.

When viewed on a plane, the tapered shape may have a direct tapered shape.

The tapered shape may have a depth of 0.25 mm or less.

The rear surface of the base substrate, which corresponds to the curved surface parts, may include: a curved area having a curvature corresponding to the side surface parts; and the tapered area.

The tapered area may be locally formed at the rear surface of the base substrate.

The light blocking layer corresponding to the side surface parts and the light blocking part corresponding to the curved surface parts may have the same size.

In accordance with an embodiment of the present disclosure, there is provided a display device including: a display panel; and a cover window disposed at a front surface of the display panel, the cover window including a planar surface part, side surface parts bent from a side surface of the planar side part, and curved surface parts bent from a curved surface of the planar surface part, wherein the cover window includes: a base substrate corresponding to the planar surface part, the side surface parts, and the curved surface parts; and a light blocking layer disposed on the bottom of the base substrate, and wherein a rear surface of the base substrate, which corresponds to the curved surface parts, includes: a curved area having a curvature corresponding to the curved surface parts; and a tapered area having a tapered shape.

The rear surface of the base substrate may be attached to the front surface of the display panel.

When viewed on a plane, the tapered shape may be linear or curved.

When viewed on a plane, the tapered shape may have a direct tapered shape.

The tapered shape may have a depth of 0.25 mm or less.

The rear surface of the base substrate corresponding to the curved parts may include: a curved area having a curvature corresponding to the side surface parts; and the tapered area.

The tapered area may be locally formed at the rear surface of the base substrate.

The light blocking layer corresponding to the side surface parts and the light blocking part corresponding to the curved surface parts may have the same size.

BRIEF DESCRIPTION OF THE DRAWINGS

The above and other features of the disclosure will become more apparent by describing in further detail embodiments thereof with reference to the accompanying drawings, in which.

DETAILED DESCRIPTION

Figure 1:
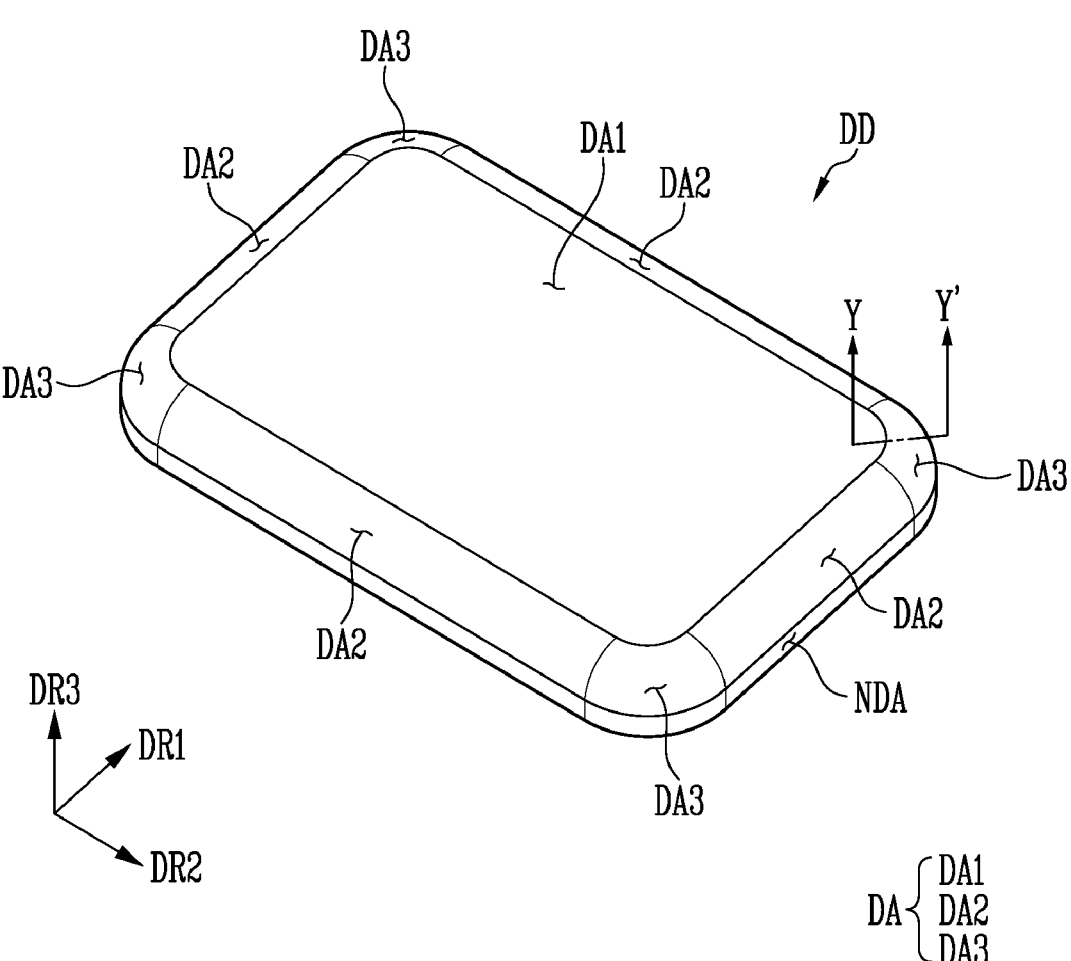
FIG. 1 is a perspective view of a display device in accordance with an embodiment of the present disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In describing the drawings, like reference numerals have been used for like elements. In the accompanying drawings, the dimensions of the structures are enlarged than the actual size in order to clearly explain the invention. It will be understood that, although the terms "first", "second", etc. may be used herein to describe various elements, these elements should not be limited by these terms. These terms are only used to distinguish one element from another element. For instance, a first element discussed below could be termed a second element without departing from the scope of the invention. Similarly, the second element could also be termed the first element.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an."

As used herein, the word "or" means logical "or" so that, unless the context indicates otherwise, the expression "A, B, or C" means "A and B and C," "A and B but not C," "A and C but not B," "B and C but not A," "A but not B and not C," "B but not A and not C," and "C but not A and not B."

It will be further understood that the terms "comprises," "comprising," "includes," and "including" when used in this specification, specify the presence of stated features, regions, integers, steps, operations, elements, or components, but do not preclude the presence or addition of one or more other features, regions, integers, steps, operations, elements, components, or groups thereof.

In the following description, when a first part is "connected" to a second part, this includes not only the case where the first part is directly connected to the second part, but also the case where a third part is interposed therebetween and they are connected to each other.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, embodiments of the present disclosure will be described in more detail with reference to the accompanying drawings.

FIG. 1 is a perspective view of a display device DD in accordance with an embodiment of the present disclosure.

Referring to FIG. 1, the display device DD may be used as a display screen of portable electronic devices such as a mobile phone, a smart phone, a tablet personal computer (PC), a mobile communication terminal, an electronic notebook, an electronic book, a portable multimedia player (PMP), a navigation system, and an ultra-mobile PC. In addition, the display device DD may be used as a display screen of various products such as a television, a notebook computer, a monitor, an advertisement board, and Internet of things (IOT).

In FIG. 1, it is illustrated that the display device DD has a quadrangular shape on a plane. However, in an embodiment, the display device DD may have various shapes including a polygon such as a triangle and a pentagon, a circle, an ellipse, and the like on a plane.

The display device DD may include a display area DA and a non-display area NDA.

The display area DA may be an area in which an image is displayed. A plurality of pixels for displaying an image may be disposed in the display area DA.

The display area DA may include a first display area DA1, second display areas DA2, and third display areas DA3.

The first display area DA1 may be an area parallel to a surface defined by a first direction DR1 and a second direction DR2. A normal direction of the first display area DA1, i.e., a thickness direction of the display device DD may be parallel to a third direction DR3. A front surface (or top surface) and a rear surface (or bottom surface) of each of members included in the display device DD may be distinguished from each other along the third direction DR3. However, directions indicated by the first direction DR1, the second direction DR2, and the third direction DR3 are relative concepts, and may be changed into other directions. The first display area DA1 may be an area in which an image is displayed in a planar area of the display device DD.

Each of the second display areas DA2 may be an area bent from a side surface of the first display area DA1. Some of the second display areas DA2 may extend along the second direction DR2, and be spaced apart from each other in the first direction DR1 with the first display area DA1 interposed therebetween. The others of the second display areas DA2 may extend along the first direction DR1, and be spaced apart from each other in the second direction DR2 with the first display area DA1 interposed therebetween. The second display area DA2 may be an area in which an image is displayed in a side area of the display device DD.

Each of the second display areas DA2 may have a single curved shape bent to have a predetermined curvature in the third direction DR3. In FIG. 1, it is illustrated that the second display areas DA2 have a single curved shape bent with the same curvature. However, in an embodiment, the second display areas DA2 may have single curved shapes bent with different curvatures.

Each of the third display areas DA3 may be an area bent from a curved surface of the first display area DAL. Each of the third display areas DA3 may be located between adjacent second display areas DA2. The third display area DA3 may be an area in which an image is displayed in a curved area of the display device DD.

Each of the third display areas DA3 may have a multicurved shape bent to have at least two curvatures in the third direction DR3. In FIG. 1, it is illustrated that the third display areas DA3 have the same multi-curved shape. However, in an embodiment, the third display areas DA3 may have different multi-curved shapes.

In FIG. 1, four second display areas DA2 and four third display areas DA3 are illustrated. However, in an embodiment, the number of second display areas DA2 and the number of third display areas DA3 may vary. For example, at least one of the four second display areas DA2 and the four third display areas DA3 may be omitted.

The non-display area NDA may be an area in which no image is displayed. A bezel area of the display device DD may be defined by the non-display area NDA. The non-display area NDA may entirely or partially surround the display area DA. A driver for providing an electrical signal or power to the display area DA, and the like may be disposed in the non-display area NDA.

Figure 2:
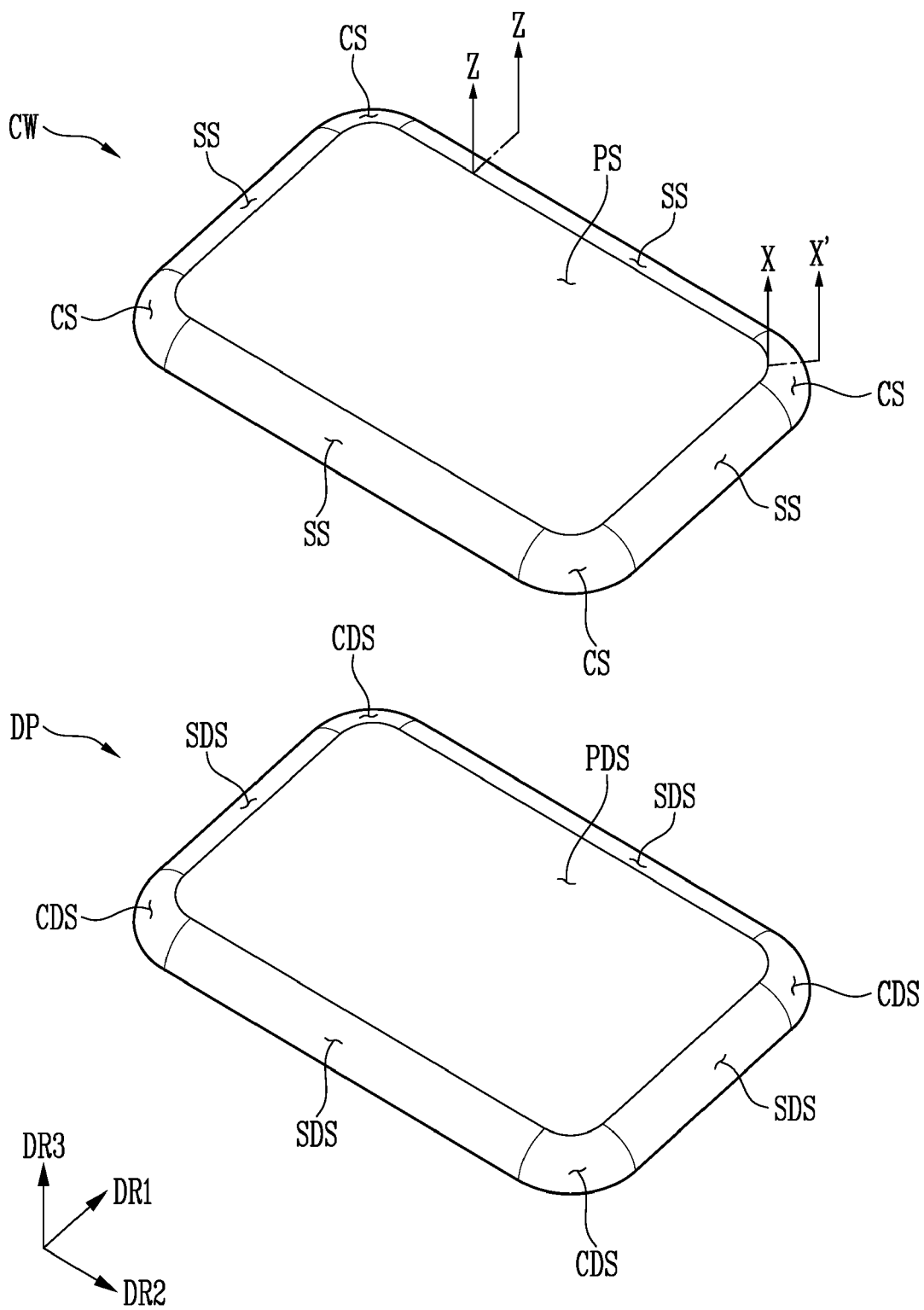
FIG. 2 is an exploded perspective view of a display device in accordance with an embodiment of the present disclosure.

FIG. 2 is an exploded perspective view of a display device DD in accordance with an embodiment of the present disclosure.

Referring to FIG. 2, the display device DD may include a cover window CW and a display panel DP. In FIG. 2, it is illustrated that the display device DD includes the cover window CW and the display panel DP. However, in an embodiment, the display device DD may further include a housing for accommodating the display panel DP by being coupled to the cover window CW.

The cover window CW may be disposed on a front surface of the display panel DP to protect the display panel DP. An image displayed on the display panel DP may be transmitted through the cover window CW, thereby being recognized by a user. The cover window CW may form an appearance of the display device DD.

The cover window CW may be attached onto the display panel DP by an adhesive layer. For example, the adhesive layer may include an adhesive member such as an Optically Clear Adhesive (OCA) or a Pressure Sensitive Adhesive (PSA).

The cover window CW may have a high transmittance to allow light emitted from the display panel DP to be transmitted therethrough. The cover window CW may have a thin thickness to minimize the weight of the display device DD. The cover window CW may have a high strength and hardness to protect the display panel DP from external impact. In an embodiment, the cover window CW may be implemented as a flexible cover window, to protect the display panel DP while being easily bent according to an external force without occurrence of any crack.

The cover window CW may include a planar surface part PS, side surface parts SS, and curved surface parts CS.

The planar surface part PS may be a plane defined by the first direction DR1 and the second direction DR2. The planar surface part PS may be a plane perpendicular to the third direction DR3. The planar surface part PS may correspond to the first display area DA1 shown in FIG. 1.

Each of the side surface parts SS may be an area bent from a side surface of the planar surface part PS. That is, some of the side surface parts SS may extend along the second direction DR2, and be spaced apart from each other in the first direction DR1 with the planar surface part PS interposed therebetween. The others of the side surface parts SS may extend along the first direction DR1, and be spaced apart from each other in the second direction DR2 with the planar surface part PS interposed therebetween. The side surface part SS may correspond to the second display area DA2 shown in FIG. 1.

Each of the side surface parts SS may have a single curved shape bent to having a predetermined curvature in the third direction DR3. In FIG. 2, it is illustrated that the side surface parts SS have a single curved shape bent with the same curvature. However, in an embodiment, the side surface parts SS may have single curved shapes bent with different curvatures. For example, the side surface parts SS extending in the first direction DR1 may have the same first curvature, and the side surface parts SS extending in the second direction DR2 may have the same second curvature. The first curvature and the second curvature may be different from each other.

Each of the curved surface parts CS may be an area bent from a curved surface of the planar surface part PS. Each of the curved surface parts CS may be located between adjacent side surface parts SS. The curved surface part CS may correspond to the third display area DA3 shown in FIG. 1.

Each of the curved surface parts CS may have a multi-curved shape bent to have at least two curvatures. Each of the curved surface parts CS may have a shape in which curved surfaces having different curvatures are continuously connected to each other. In FIG. 2, it is illustrated that the curved surface parts CS have the same multi-curved shape. However, in an embodiment, the curved surface parts CS may have different multi-curved shapes.

The display panel DP may include a planar display part PDS, side display parts SDS, and corner display parts CDS.

The planar display part PDS may be disposed in parallel to the planar surface part PS of the cover window CW, and have a shape corresponding to the planar surface part PS. That is, the planar display part PDS may be a display area having a planar shape.

Each of the side display parts SDS may be disposed corresponding to each of the side surface parts SS of the cover window CW. In FIG. 2, it is illustrated that each of the side display parts SDS has a curved shape corresponding to each of the side surface parts SS of the cover window CW. However, in an embodiment, some of the side display parts SDS may have a planar shape.

Each of the side display parts SDS may be bent from the planar display part PDS to have a predetermined curvature. In FIG. 2, it is illustrated that the side display parts SDS are bent with the same curvature. However, in an embodiment, the side display parts SDS may be bent with different curvatures.

Each of the corner display parts CDS may be disposed corresponding to each of the curved surface parts CS of the cover window CW. Each of the corner display parts CDS may have a curved shape corresponding to each of the curved surface parts CS of the cover window CW. In FIG. 2, it is illustrated that each of the corner display parts CDS has a curved shape corresponding to each of the curved surface parts CS of the cover window CW. However, in an embodiment, some of the corner display parts CDS may have a planar shape.

Each of the corner display parts CDS may be bent from the planar display part PDS to have a predetermined curvature. As used herein, the word "bent" means "curved" but not necessarily the past tense of the verb "bend." In FIG. 2, it is illustrated that the corner display parts CDS are bent with the same curvature. However, in an embodiment, the corner display parts CDS may be bent with different curvatures.

The cover window CW and the display panel DP, which are described above, may be attached to each other through a lamination process. For example, the lamination process may be performed using a method in which the cover window CW and the display panel DP are pressurized using a roller, a squeezer or the like in a state in which an adhesive member is applied between the cover window CW and the display panel DP.

However, in the lamination process, the corner display part CDS of the display panel DP is incompletely bent due to the limitation of shrinkage of the display panel DP, and hence an unexpected space may be generated between the corner display part CDS of the display panel DP and the curved surface part CS of the cover window CW. Accordingly, as the corner display part CDS of the display panel DP is pressed by the curved surface part CS of the cover window CW, the corner display part CDS of the display panel DP receives an excessive pressure, and therefore, buckling may occur.

Figure 3:
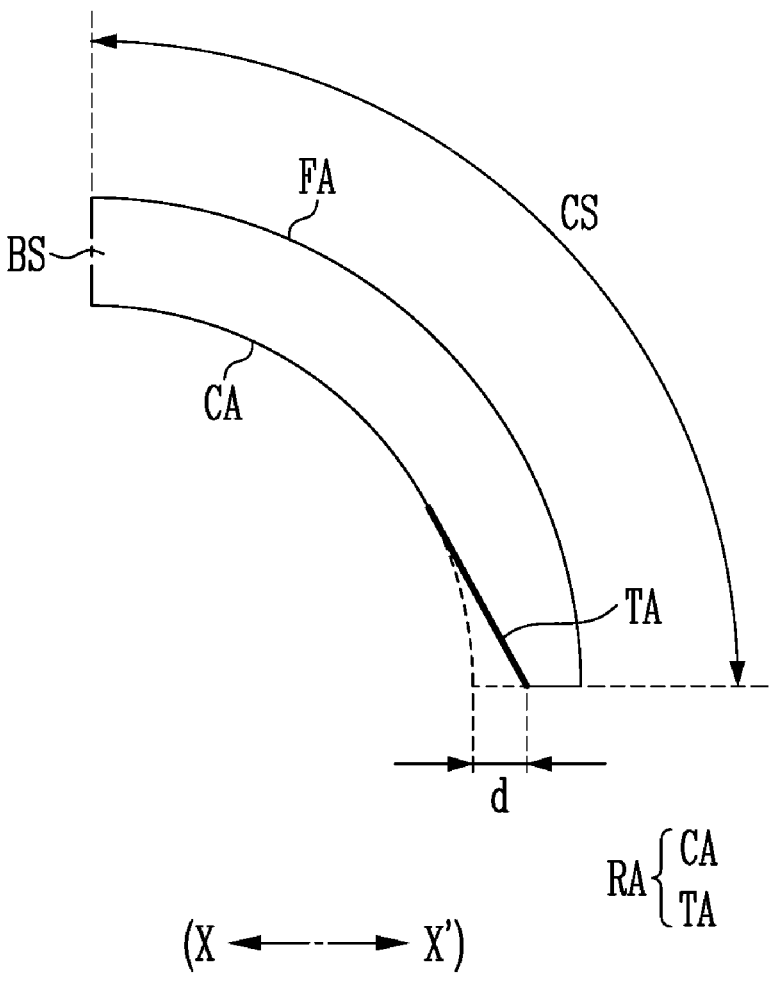
FIG. 3 is a sectional view of a cover window in accordance with an embodiment of the present disclosure.

FIG. 3 is a sectional view of a cover window CW in accordance with an embodiment of the present disclosure. FIG. 3 is a sectional view taken along line X-X' shown in FIG. 2.

Referring to FIG. 3, the cover window CW may include a base substrate BS. The base substrate BS may include glass or plastic. For example, the cover window CW may be implemented as an Ultra-Thin Glass (UTG) of which strength is reinforced through chemical reinforcement or thermal reinforcement.

The base substrate BS may include a front area FA and a rear area RA.

The front area FA is an area not attached to the display panel DP, and may be a surface spaced apart from the display panel DP. The front area FA may have a multi-curved shape bent to have at least two curvatures in the third direction DR3.

The rear area RA is an area attached to the display panel DP (or the corner display part CDS), and may be a surface in contact with the display panel DP.

In an embodiment, the rear area RA of the base substrate BS, which corresponds to the curved surface parts CS of the cover window CW, may include a curved area CA and a tapered area TA. The rear area RA of the base substrate BS may be understood as the rear area RA of the cover window CW. In FIG. 3, the tapered area TA is indicated by a bold line to be distinguished from the curved area CA.

The curved area CA may have a multi-curved shape bent to have at least two curvatures in the third direction DR3.

The tapered area TA may be an area having a tapered shape. The tapered area TA may be formed through taper processing known in the art. The tapered area TA may be formed in the rear area RA of the base substrate BS, which corresponds to each of the four curved surface parts CS of the cover window CW.

The tapered shape formed in the tapered area TA may have a depth d of 0.25 mm or less. When the depth d of the tapered shape is out of the above-described range, a buckling prevention effect may be reduced.

In FIG. 3, it is illustrated that the tapered shape of the tapered area TA has a linear shape. However, in an embodiment, the tapered shape of the tapered area TA may have a curved shape.

In FIG. 3, it is illustrated that the tapered area TA has a direct tapered shape. However, in an embodiment, the tapered area TA may have an inverse tapered shape.

In FIG. 3, it is illustrated that a size of the tapered area TA is smaller than a size of the curved area CA. However, in an embodiment, the size of the tapered area may be equal to or greater than the size of the curved area CA. That is, the tapered area TA may be formed with various sizes by considering occurrence of buckling.

Figure 4:
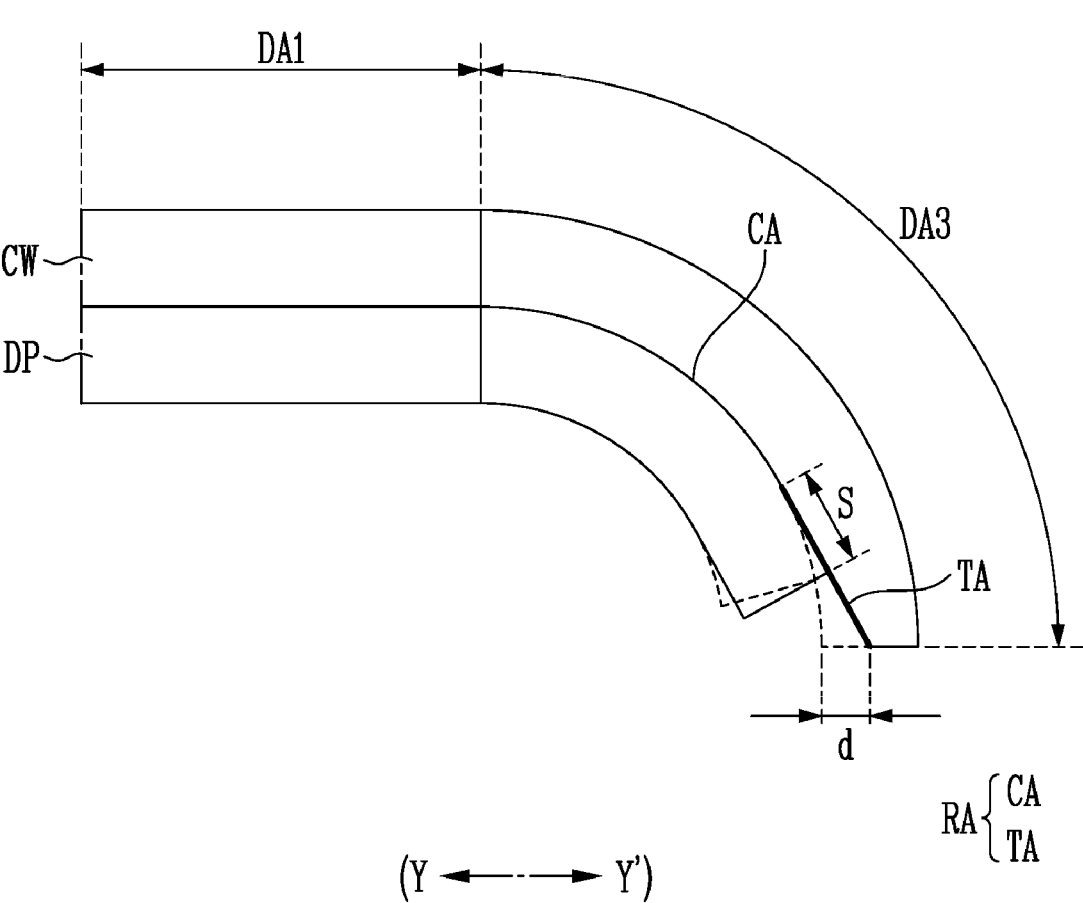
FIG. 4 is a sectional view of a display device in accordance with an embodiment of the present disclosure.

FIG. 4 is a sectional view of a display device DD in accordance with an embodiment of the present disclosure. FIG. 4 is a sectional view taken along line Y-Y' shown in FIG. 1.

Referring to FIGS. 1 to 4, as the rear area RA of the curved surface part CS of the cover window CW includes the tapered area TA, a surface area S of the curved surface part CS of the cover window CW, which is attached to the corner display part CDS of the display panel DP, may become large. Accordingly, the pressure which the corner display part CDS of the display panel DP receives from the curved surface part CS of the cover window CW is reduced, and therefore, occurrence of buckling can be prevented or reduced.

On the other hand, when the rear area RA of the curved surface part CS of the cover window CW includes only the curved area CA (indicated by a dotted line), a surface area of the curved surface part CS of the cover window CW, which is attached to the corner display part CDS of the display panel DP, is small. Accordingly, the corner display part CDS of the display panel DP receives an excessive pressure from the curved surface part CS of the cover window CW, and therefore, buckling may occur.

Figure 5:
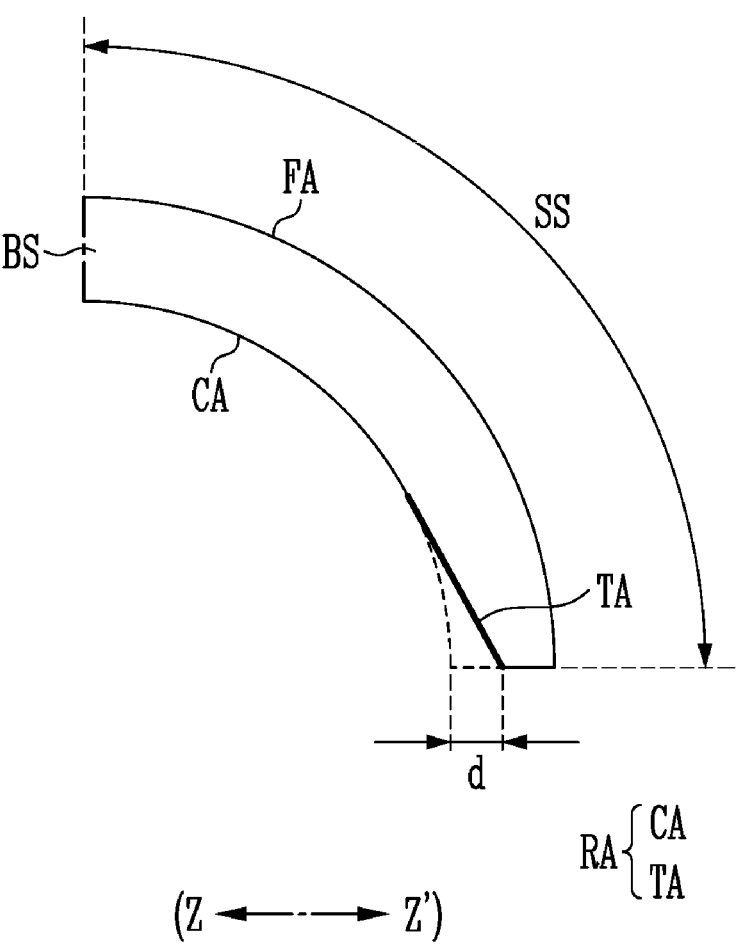
FIG. 5 is a sectional view of a cover window in accordance with an embodiment of the present disclosure.

FIG. 5 is a sectional view of a cover window CW in accordance with an embodiment of the present disclosure. FIG. 5 is a sectional view taken along line Z-Z' shown in FIG. 2. In relation to FIG. 5, descriptions of portions overlapping with those shown in FIG. 3 will be simplified or omitted.

Referring to FIG. 5, the tapered area TA may be selectively formed in not only the curved surface part CS of the cover window CW but also the rear area RA of the base substrate BS, which correspond to the side surface part SS of the cover window CW. Accordingly, processing easiness can be increased as compared with when the tapered area TA is formed in only the curved surface part CS of the cover window CW, and stress which the display panel receives can be distributed. The tapered area TA may be formed in the rear area RA of the base substrate BS, which corresponds to each of the four side surface parts SS of the cover window CW.

Figure 6:
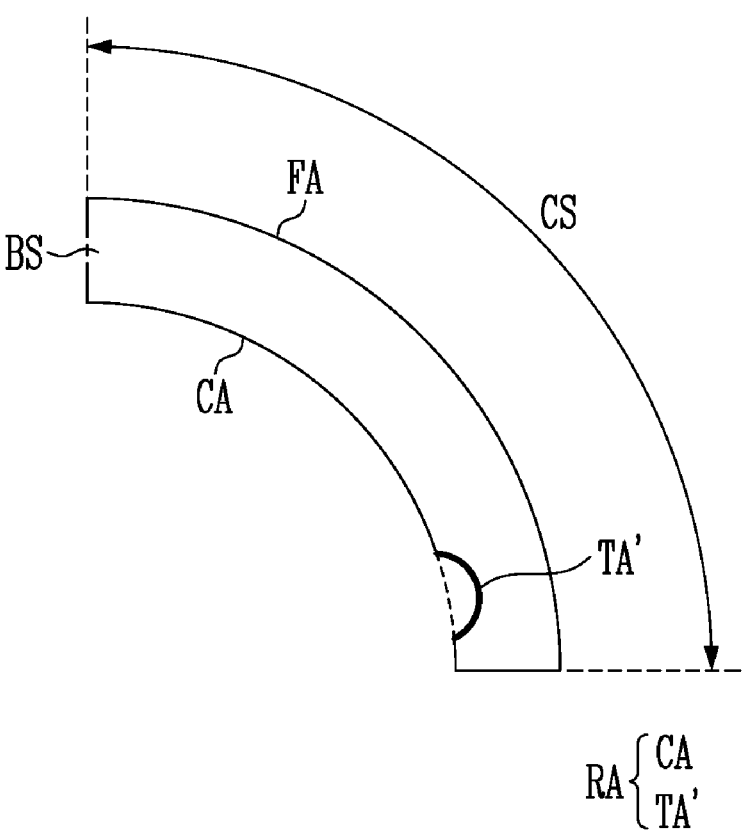
FIG. 6 is a sectional view of a cover window in accordance with an embodiment of the present disclosure.

FIG. 6 is a sectional view of a cover window CW in accordance with an embodiment of the present disclosure.

Referring to FIG. 6, the rear area RA of the base substrate BS, which corresponds to the curved surface part CS of the cover window CW, may include a tapered area TA' which is locally formed. The tapered area TA' is locally formed in only an area having a high probability that buckling will occur in the rear area RA of the curved surface part CS of the cover window CW, so that the occurrence of bucking can be more efficiently prevented or reduced. The above-described tapered area TA' may be formed in the rear area RA of the base substrate BS, which corresponds to each of the four curved surface parts CS of the cover window CW.

Figure 7:
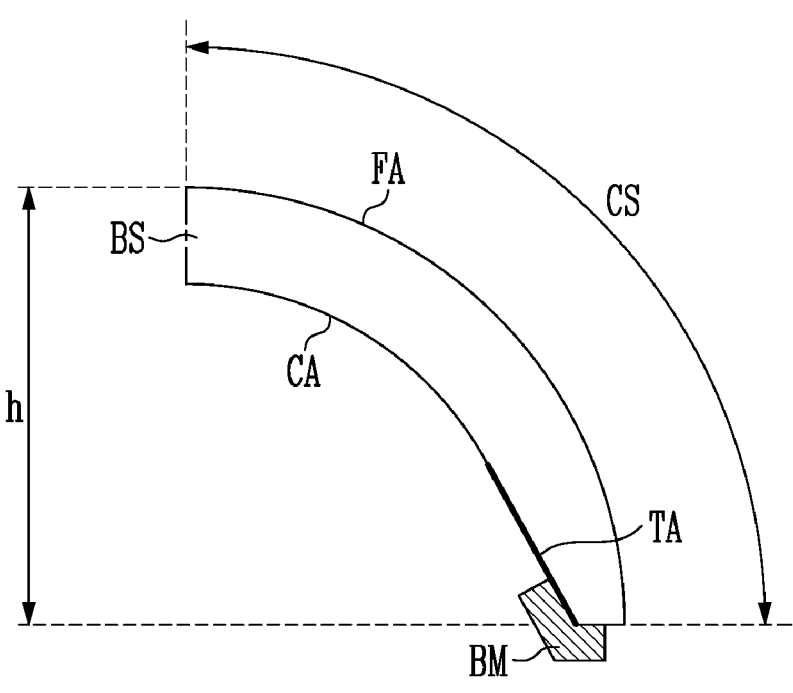
FIG. 7 is a sectional view of a cover window in accordance with an embodiment of the present disclosure.

FIG. 7 is a sectional view of a cover window CW in accordance with an embodiment of the present disclosure.

Referring to FIG. 7, the cover window CW may further include a light blocking layer BM disposed on the bottom of the base substrate BS. The light blocking layer BM may be a black matrix. The light blocking layer BM may be formed, including an organic light blocking material or an inorganic light blocking material, which includes a black pigment or a black dye.

Meanwhile, buckling may be deepened as a height h of the curved surface part CS of the cover window CW becomes higher, and therefore, there may be a limitation in implementing the height of the curved surface part CS of the cover window CW. Accordingly, a size of the light blocking layer BM disposed in the curved surface part CS of the cover window CW and a size of a light blocking layer (not shown) disposed in the side surface part SS of the cover window CW are different from each other, and therefore, it may be difficult to form a uniform bezel area in the display device DD.

As described above, the rear area RA of the curved surface part CS of the cover window CW includes the tapered area TA, so that occurrence of buckling can be prevented or reduced. Thus, the height of the curved surface part CS of the cover window CW can be easily implemented.

Accordingly, the light blocking layer BM corresponding to the curved surface part CS of the cover window CW and the light blocking layer (not shown) corresponding to the side surface part SS of the cover window CW can have the same size. Thus, a uniform bezel area can be formed in the display device DD.

In accordance with the present disclosure, in a lamination process, as the surface area of the cover window attached to the corner display part of the display panel increases, compressive stress which the display panel receives is decreased. Thus, occurrence of buckling due to deformation of the corner area of the display panel can be prevented or reduced.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, or elements described in connection with a particular embodiment may be used singly or in combination with features, characteristics, or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A cover window including a planar surface part, side surface parts bent from a side surface of the planar side part, and curved surface parts bent from a curved surface of the planar surface part, the cover window comprising:

a base substrate corresponding to the planar surface part, the side surface parts, and the curved surface parts; and a light blocking layer disposed on the bottom of the base substrate, wherein a rear surface of the base substrate, which corresponds to the curved surface parts, includes:

a curved area having a curvature corresponding to the curved surface parts; and a tapered area having a tapered shape in a cross-sectional view of the base substrate, the tapered shape extending from the curved area of the base substrate in the cross-sectional view.

2. The cover window of claim 1, wherein the rear surface of the base substrate is an area attached to the display panel.

3. The cover window of claim 1, wherein, in the cross-sectional view, the tapered shape is linear or curved.

4. The cover window of claim 1, wherein, in the cross-sectional view, the tapered shape has a direct tapered shape.

5. The cover window of claim 1, wherein the tapered shape has a depth of 0.25 mm or less.

6. The cover window of claim 1, wherein the rear surface of the base substrate, which corresponds to the curved surface parts, includes:

a curved area having a curvature corresponding to the side surface parts; and the tapered area.

7. The cover window of claim 1, wherein the tapered area is locally formed at the rear surface of the base substrate.

8. The cover window of claim 1, wherein the light blocking layer corresponding to the side surface parts and the light blocking part corresponding to the curved surface parts have the same size.

9. A display device comprising:

a display panel; and a cover window disposed at a front surface of the display panel, the cover window including a planar surface part, side surface parts bent from a side surface of the planar side part, and curved surface parts bent from a curved surface of the planar surface part, wherein the cover window includes:

a base substrate corresponding to the planar surface part, the side surface parts, and the curved surface parts; and a light blocking layer disposed on the bottom of the base substrate, and wherein a rear surface of the base substrate, which corresponds to the curved surface parts, includes:

a curved area having a curvature corresponding to the curved surface parts; and a tapered area having a tapered shape in a cross-sectional view of the base substrate, the tapered shape extending from the curved area of the base substrate in the cross-sectional view.

10. The display device of claim 9, wherein the rear surface of the base substrate is attached to the front surface of the display panel.

11. The display device of claim 9, wherein, in the cross-sectional view, the tapered shape is linear or curved.

12. The display device of claim 9, wherein, in the cross-sectional view, the tapered shape has a direct tapered shape.

13. The display device of claim 9, wherein the tapered shape has a depth of 0.25 mm or less.

14. The display device of claim 9, wherein the rear surface of the base substrate corresponding to the curved parts includes:

a curved area having a curvature corresponding to the side surface parts; and the tapered area.

15. The display device of claim 9, wherein the tapered area is locally formed at the rear surface of the base substrate.

16. The display device of claim 9, wherein the light blocking layer corresponding to the side surface parts and the light blocking part corresponding to the curved surface parts have the same size.

* * * * *